Dec. 20, 1955      N. A. SHORE      2,727,670
AUTOMATIC LIQUID DISPENSING APPARATUS
Filed Dec. 1, 1954      2 Sheets-Sheet 1
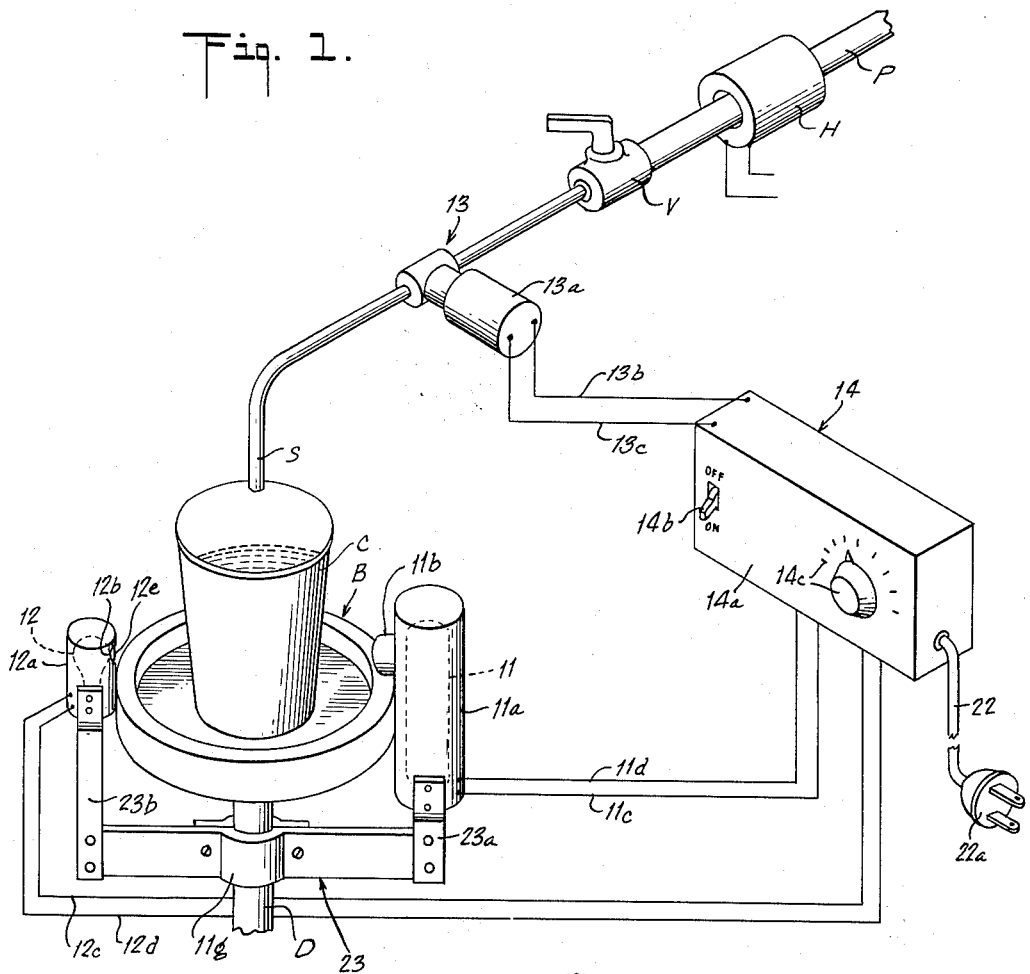
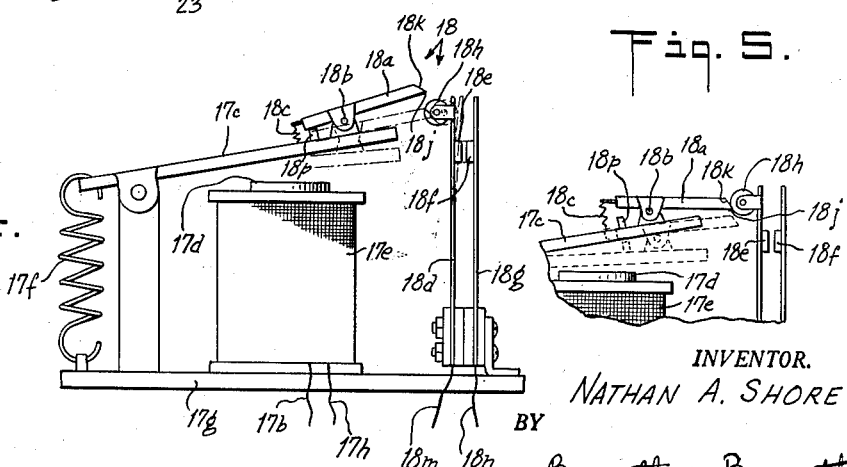
INVENTOR.
NATHAN A. SHORE
BY Barnett & Barnett
ATTORNEYS INVENTOR.
NATHAN A. SHORE
BY
Barnett & Barnett
ATTORNEYS

United States Patent Office 2,727,670
Patented Dec. 20, 1955

2,727,670

AUTOMATIC LIQUID DISPENSING APPARATUS

Nathan A. Shore, New York, N. Y., assignor to Ritter Company, Inc., Rochester, N. Y., a corporation of Delaware Application December 1, 1954, Serial No. 472,293

5 Claims. (Cl. 226—127)

This invention relates to improved apparatus for dispensing a predetermined quantity of liquid into a receptacle automatically actuated by replacement of the receptacle beneath a delivery spout, and more particularly is directed to such automatically operated apparatus adaptable for combination with a water supply fountain of dental engine units ensuring constant availability of a measured quantity of water in a cup for mouth rinsing without requiring manual operation other than replacement of the cup under the delivery spout.

Among the objects of the invention is to generally improve apparatus of the character described for automatic delivery of a predetermined quantity of liquid into a receptacle, as for example, a drinking cup, each time the latter is replaced from beneath a water supply fountain spout, which apparatus shall comprise few and relatively simple parts which can readily be provided as an accessory on existing water supply fountains of dental engine units and elsewhere or installed as an improved integral part of such dental units, which shall eliminate all manual operations to make available a charge of warm water as required by patients seated in a dental chair, which shall be readily adjustable to deliver varying desired quantities of water ranging from a mouthful to a cupful, which after installation shall require a minimum of maintenance and attention, which shall be relatively cheap to manufacture, foolproof in operation, efficient and practical to a high degree in use.

Other objects of the invention will in part be obvious and in part hereinafter pointed out.

The invention accordingly consists of features of construction, combinations of elements and arrangements of parts which will be exemplified in the constructions hereinafter disclosed, the scope of the application of which will be indicated in the claims following.

In the accompanying drawing in which various embodiments of the invention are shown:

Fig. 1 is a schematic view in perspective of an accessory apparatus including a photo-electric cell mounted on a water fountain cup basin seat having a solenoid operated water valve and a timer mechanism embodying the invention shown installed in connection with a water supply source.

Figure 2:
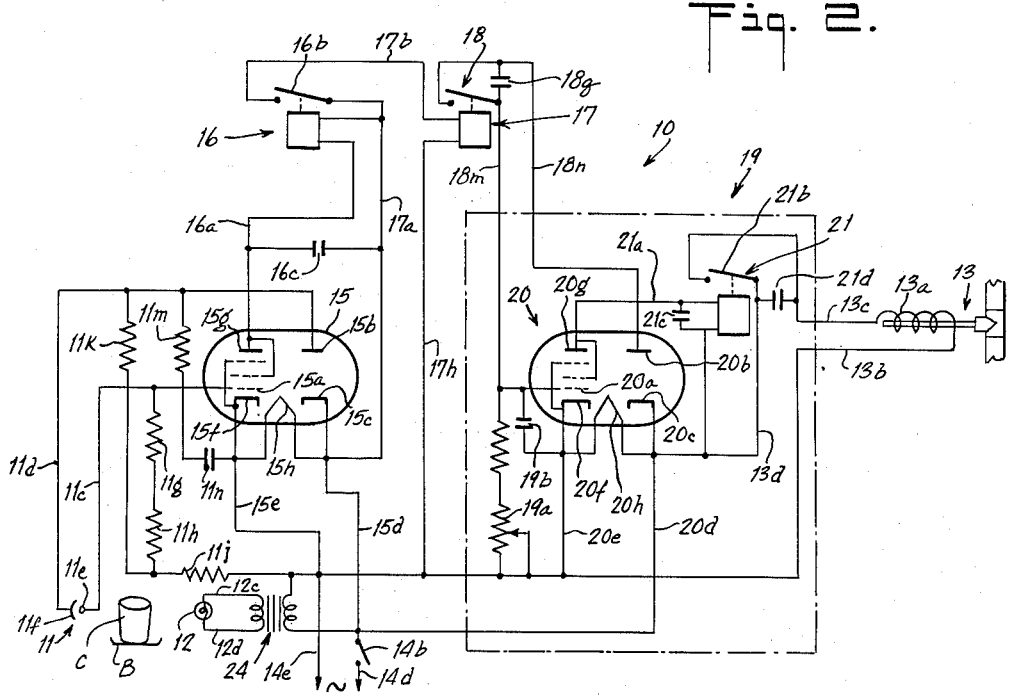
Fig. 2 is a wiring diagram of the photo-electric cell actuating circuit connected with an electronic timer embodying the invention.
Figure 3:
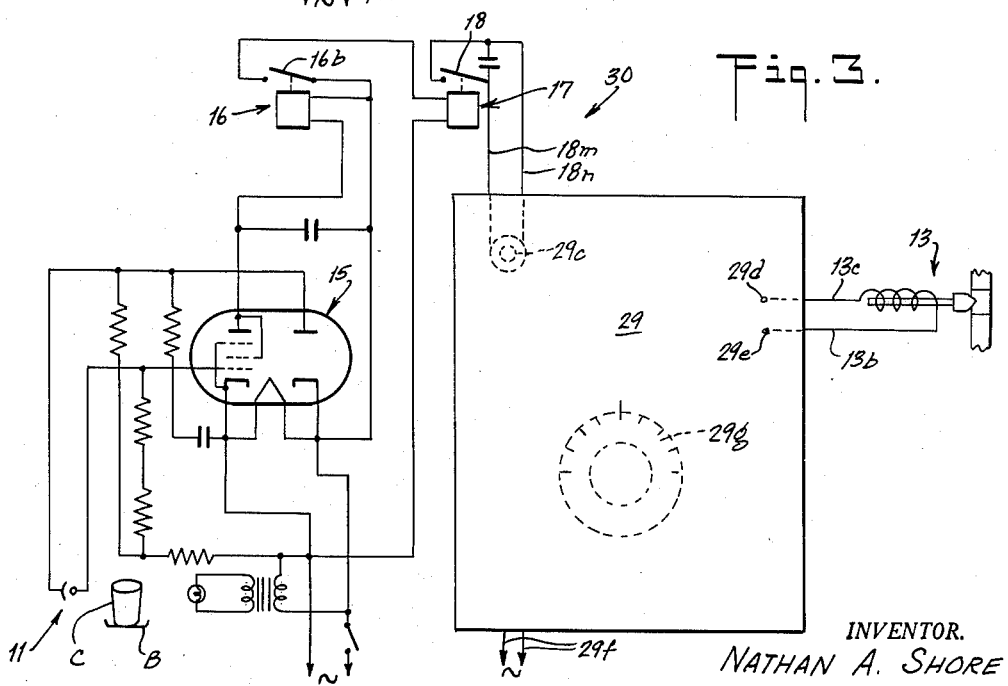
Fig. 3 is a wiring diagram of the photo-electric cell actuating circuit in connection with a mechanical timer embodying the invention, the mechanical timer being shown schematically.

Fig. 4 is an elevational view of an impulse relay and momentarily acting switch forming a part of the accessory apparatus shown schematically in Figs. 2 and 3 having an armature mounting a pivoted cam arm for closing the flexing terminal mounted switch contact points, the armature being shown in full lines in a deenergized position with the cam arm held extended by a biasing spring and shown in broken lines in a position along the path of travel just after energization of the coil with the cam arm engaging the cam roller and momentarily closing the contact points, and Fig. 5 is a fragmentary view of a portion of the impulse relay and momentarily acting switch shown in Fig. 4 with the armature indicated in broken lines in an extreme coil energized position against the magnetic core and shown in full lines in a position along the path of travel on return to the normal deenergized position indicating the pivoting action of the cam arm when engaging the cam roller for passing the latter without closing the contact points.

Referring in detail to the drawing, 10 denotes generally an accessory apparatus diagrammatically illustrated in Fig. 1 for mounting on a dental engine unit (not shown) to automatically provide a constant supply of water in a drinking cup C made of opaque or slightly translucent material for mouth rinsing by replacement thereof on a fountain cup supporting base B of said engine unit.

The dental engine unit may be of the type shown and more fully described in my co-pending application Serial No. 371,259, filed July 30, 1953, for Automatic Water Tumbler Filling Apparatus for Dental Units.

Apparatus 10 may comprise a photo-electric cell 11 enclosed within an opaque housing 10a suitably secured, as for example, to one arm 23a of split clamping bracket 23 mounted about drainpipe D leading from below cup supporting basin B and a suitable light source, such as, electric lamp 12, which may also be enclosed in an opaque housing 12a carried on the other arm 23b of bracket 23. As is clear from Fig. 1, housings 11a and 12a extend up above the level of cup supporting basin B, lamp housing 12a being provided with an opening or window 12b mounting lens 12e positioned in alignment with a shielded opening or window 11b of photo-electric cell housing 11a for directing the light rays from lamp 12 as a beam into the latter to energize photo-electric cell 11 in the well understood manner.

Cup C, as seen in Fig. 1, when properly seated on basin B, will interrupt the beam of light passing from lamp 12 to photo-electric cell 11 and will also be positioned below a delivery spout S terminating water delivery pipe P. The latter may be connected in the well understood manner to a water supply source, such as, furnished by the general building plumbing system or in a manner similar to that more fully set forth in my said co-pending application.

A solenoid operated valve 13 of any well known construction, which is normally spring pressed into closed position and opens upon energizing the solenoid, may be interposed at a suitable location along pipe P for controlling the flow of water from spout S. As seen in Fig. 1, a manually operated valve V and a thermostatic control water heater H may also be provided at suitable locations along pipe P between valve 13 and the water supply source or a hot and cold water mixing chamber arrangement may be utilized as set forth in my said co-pending application.

For housing the electro-mechanical equipment hereinafter described comprising accessory apparatus 10, a control box 14 may be situated at any convenient location on the dental engine unit or, if desired, may be built-in as an integral part thereof in any well understood manner and, as seen in Fig. 1, has a control panel 14a on which are mounted a power switch 14b and a time setting knob and dial 14c.

Control box 14 may have suitable electric wiring extending therefrom for electrically interconnecting the remote parts comprising accessory apparatus 10, as for example, as shown in Fig. 1, electric cord 22 terminating in plug 22a for connection with a suitable electric power source, such as, the standard house current, wiring 13b and 13c to solenoid 13, wiring 12c and 12d to lamp 12 and wiring 11c and 11d to photo-electric cell 11.

The electronic, electrical and mechanical component parts required for operating accessory apparatus 10 may be mounted in control box 14 in any well understood manner and may be arranged as an embodiment of the invention in the circuit relation shown in Fig. 2.

Referring now to Fig. 2, photo-electric cell 11 may be of any well understood construction, having an anode 11e connected through wiring 11c directly to grid 15a of an electronic tube 15, here shown to be of the combined rectifier and amplifier type. Cathode 11f of cell 11 is connected through wiring 11d directly to the rectifier anode 15b, the rectifier cathode 15c being connected through circuit 15d and power switch 14b to one power line 14d of electric cord 22. Photo-electric cell anode 11e may also be connected to the other power line 14e of cord 22 through series shunt resistances 11g, 11h and 11j and to cell cathode 11f through series shunt resistances 11g, 11h and 11k. Cell cathode 11f may also be provided with a bleeder block, composed of resistance 11m in series with capacitor 11n, connected to circuit 15e. The latter connects said other power line 14e of electric cord 22 to amplifier cathode 15f, amplifier anode 15g being in series circuit through wiring 16a with a sensitive relay 16. When energized, sensitive relay 16 closes switch 16b completing the circuit between wiring 17a and 17b to activate impulse relay 17 which is also connected to return lead 17h.

Impulse relay 17 is shown in Fig. 4 to comprise an armature 17c mounted for pivotal movement toward and away from magnetic core 17d of coil 17e. Armature 17c is normally retained in a position away from core 17d by a retractile spring 17f and forms part of a momentarily acting switch 18 by carrying for movement therewith cam arm 18a which is pivoted at a midportion 18b thereof and held in a limited normally extended position against a stop boss 18p as shown in Fig. 4 by a biasing spring 18c. One conact 18e of switch 18 is carried by a flexing terminal 18d arranged upon flexion thereof to close a timer initiating circuit through another contact 18f which may also be carried on a flexing terminal 18g. Flexing terminals 18d and 18g, which may be mounted on base 17g of impulse relay 17, extend normally in parallel spaced relation maintaining switch 18d open. A cam roller 18h, carried by flexing terminal 18d in the path of movement of a free end 18j of cam arm 18a, serves to deflect said terminal 18d toward terminal 18g bringing contacts 18e and 18f together momentarily until cam arm 18a clears and releases roller 18h as armature 17c travels toward magnetic core 17d when coil 17e is energized, as shown in broken lines in Fig. 4.

When coil 17e is de-energized, retractile spring 17f will return armature 17c to its normal position away from core 17d and in so doing beveled surface 18k of arm end 18j is brought into engagement with cam roller 18h pivoting arm 18a at its mid-portion 18b against the action of biasing spring 18c through an angle sufficient for arm end 18j to pass cam roller 18h permitting said return of armature 17c without closing switch 18, as will be clear from Fig. 5. It is to be understood that biasing spring 18c is relatively weak in comparison to flexing terminal 18d and will permit pivoting of cam arm 18a before deflection of terminal 18d can occur.

Momentarily acting switch 18 may be arranged, when closed, to initiate a timer generally designated as 19 which will close the circuit to solenoid 13a of valve 13 during a time interval predetermined by the setting of the timer thereby opening valve 13 and delivering a measured quantity of water to cup C through spout S.

In a preferred form the invention, timer 19, as shown in Fig. 2, may be of an electronic type comprising electronic tube 20 which may be of the combined rectifier and amplifier type similar to tube 15. Terminal 18d may be connected through wiring 18m directly to the grid 20a while the other terminal 18g through wiring 18n is connected to rectifier anode 20b. The rectifier cathode 20c is connected through circuit 20d in parallel with circuit 15d and power switch 14b to said line 14d of electric cord 22, circuit 20e being in parallel with circuit 15e for connecting amplifier cathode 20f with said other line 14e. Amplifier anode 20g connects through wiring 21a with timer relay 21 which, during the period of energization, closes switch 21b for completing the circuit between wiring 13c and 13d to activate solenoid 13a and open valve 13.

A timing rheostat 19a and capacitor 19b are provided in connection with grid 20a serving in the well understood manner to provide the desired time intervals during which timer relay 21 is activated, said time intervals being predetermined by setting rheostat 19a through its manual control knob and dial 14c provided on said control panel 14a.

Lamp 12 may be of any suitable type for providing the required light intensity to actuate photo-electric cell 11 and may be powered from any available source. In the embodiment of the invention shown in Fig. 2, a six to eight volt lamp has been found to give satisfactory results with a photo-electronic tube known commercially as "911." Where such six or eight volt lamp 12 is used, a suitable transformer 24 may be provided for convenience in control box 14 having the primary windings thereof connected across power lines 14d and 14e.

Sensitive relay 16, switch 18, timer relay 21 and switch 21b may each be provided across the terminals thereof with suitable capacitors 16c, 18q, 21c and 21d, respectively, for smoothness of operation of the elements in the well understood manner.

After providing and assembling the parts of accessory apparatus 10 on a dental engine unit as hereinbefore described and shown in Figs. 1, 2, 4 and 5 of the drawings, the operation thereof will be apparent.

After first setting knob and dial 14c to a desired time interval which may also be calibrated to show the amount of water to be delivered, as for example, fifteen seconds for delivering a charge of two ounces of water through spout S, placing cup C in water receiving position on basin B and connecting plug 22a to a suitable electric current source, upon throwing switch 14b to the "on" position, heater filaments 15h and 20h of electronic tubes 15 and 20, respectively, will receive electric power as will lamp 12. After the elapse of a required warm-up interval of time, accessory 10 will commence operation. Since the beam of light from lamp 12 is now interrupted by cup C, photo-electric cell 11 is not activated so that the potential on grid 15a permits a flow of current for energizing sensitive relay 16 and closing switch 16b. The closing of the latter in turn energizes impulse relay 17 causing magnetic core 17d to attract armature 17c carrying extended cam arm 18a. The latter in its movement toward the core arm 17d momentarily closes switch 18 actuating electronic timer 19 to close switch 21b for the time interval predetermined by the knob and dial 14c setting of timing rheostat 19a. The closing of switch 21b energizes solenoid 13a opening valve 13 during said predetermined time interval and delivering the desired amount of water through spout S into cup C.

At the end of said time interval, timer relay switch 21b will open, deenergizing solenoid 13a and closing valve 13. However, as long as cup C remains in position on basin B, sensitive relay 16 and impulse relay 17 will be energized retaining armature 17c in position against core 17d, as shown in broken lines in Fig. 5. Upon removal of cup C from basin B, light beams from lamp 12 will strike photoelectric cell 11 changing the potential of grip 15a to deenergize sensitive relay 16, opening switch 16b and deenergizing impulse relay 17. Thereupon, armature 17c carrying cam arm 18a is returned by retractile spring 17f to its normal position away from core 17d, shown in full lines in Fig. 4. Beveled surface 18k of cam arm 18a in its path of travel to said normal position engages cam roller 18h causing pivoting thereof at 18b through an angle sufficient for arm end 18j to pass clear of cam roller 18h without closing switch 18, as is clearly shown in Fig. 5 and hereinbefore more fully described.

With the return of armature 17c to said normal position, accessory apparatus 10 is ready for initiation of a new cycle by the interruption of light beams from lamp 12 falling on photo-electric cell 11 which is accomplished each time cup C is replaced on basin B. Thus, with each such interruption of the light beams, sensitive relay 16 and impulse relay 17 are energized to momentarily close switch 18 and initiate timer 19 in the manner hereinbefore fully described delivering a predetermined quantity of water into cup C. With each restoration of the continuity of the light beams by removal of cup C from basin B, armature 17c is retracted without closing switch 18 to its said normal position ready for the next cycle.

It will thus be seen that accessory apparatus 10 when installed in a dental engine unit will free the dentist from concerning himself with supplying water to the patient's cup C. A setting of knob and dial 14c for delivering about two ounces of water per cycle when utilizing the popular five ounce size cup has been found to give satisfactory results for the needs of most patients by providing enough water for about two mouth rinsings yet by not filling the cup so full as to cause accidental spilling.

A modified form of the invention is shown in Fig. 3 as accessory 30 in which a mechanical timer, generally designated at 29, is utilized in place of the electronic timer 19. In this form of the invention, the photo-electric cell 11, its associated electronic tube 15, sensitive relay 16, switch 16b, impulse relay 17 and switch 18 are similarly used as in the combination with timer 19 shown in Fig. 2.

Said mechanical timer 29, indicated schematically in Fig. 3, may be of the type known commercially as "Time-O-Lite." As is well known in the art, these timers are of the self-resetting type and have a push button switch for initiating the timing mechanism. Thus, terminals 18d and 18g of momentarily acting switch 18 are connected to the terminals of said timer push button switch, indicated schematically in broken lines in Fig. 3 at 29c, while wiring 13b and 13c of valve solenoid 13a are connected to output terminals 29d and 29e. Timer 29 may also be provided with electric power from any suitable power source, as for example, from the house current through wiring 29f.

When timer 29 is used, a time setting knob and dial 29g, indicated schematically in broken lines in Fig. 3 forming part of the Time-O-Lite unit, replaces the knob and dial 14c of control box 14. Thus, the latter may accordingly be reduced to a size sufficient to house electronic tube 15, sensitive relay 16, impulse relay 17, momentarily acting switch 18 and associated wiring, capacitors and resistances as one unit with the "Time-O-Lite" unit connected thereto by wiring; or the component parts of such mechanical self-resetting timer 29 may be provided with the other electrical parts in a unitary housing (not shown) similar to control box 14 within the scope of the invention.

Accessory 30 utilizing mechanical timer 29 and connected with photo-electric cell 11, sensitive relay 16, switch 16b, impulse relay 17 and momentarily acting switch 18 as hereinbefore described and shown in Fig. 3 will operate in a manner similar to accessory 10 hereinbefore fully described.

It is thus seen that there is provided improved automatic liquid dispensing apparatus whereby the several objects of the invention are achieved and which are well adapted to meet the conditions of practical use.

As various possible embodiments might be made of the above invention, and as various changes might be made in the embodiments above set forth, it is to be understood that all matters herein set forth or shown in the accompanying drawing are to be interpreted as illustrative and not in a limiting sense.

Having thus described my invention, I claim as new and desire to secure by Letters Patent:

1. A device of the character described comprising a fluid source having a conduit terminating in a delivery spout, a solenoid operated valve interposed in said conduit normally in a closed position for shutting off said fluid source to said delivery spout, a basin seat located a spaced distance below the level of said spout for supporting a receptacle in position to receive fluid delivered from said spout, a photo-electric cell located adjacent said seat, a light source positioned to project light beams across said seat to energize the photo-electric cell in the absence of a receptacle thereon, said light beams being interrupted by said receptacle when positioned on the seat, an electrically connected first relay actuated switch controlled by said photo-electric cell, a momentarily acting second switch connected to be actuated by said first switch when light beams from said source are interrupted on positioning a receptacle on said seat, and a timing mechanism actuated by said second switch energizing the solenoid valve during a predetermined set time interval for opening the valve to deliver a desired amount of fluid through said spout into the receptacle.

2. The device as defined in claim 1 in which said momentarily acting second switch includes an electrically operated relay, a swingable mechanical means actuated by the relay and a pair of normally open circuit closing contact points, said mechanical means and contact points being so constructed and arranged to momentarily close said contact points to actuate said timing mechanism as said mechanical means swings in one direction on electrical energization of said relay and to swing said mechanical means in an opposite direction upon deenergization of the relay preparatory to a succeeding cycle without effecting closure of said points.

3. The device as defined in claim 1 in which said first relay actuated switch is connected to be energized when said light beams are interrupted by said receptacle on said basin seat and to be deenergized when said light beams impinge on the photo-electric cell.

4. The device as defined in claim 1 in which said timing mechanism is constructed and arranged for self-resetting at the end of each time interval independently of the photo-electric cell.

5. The device as defined in claim 1 in which said first relay actuated switch is connected to be energized when said light beams are interrupted by said receptacle on said basin seat and to be deenergized when said light beams impinge on the photo-electric cell, said momentarily acting second switch including an electrically operated relay, a swingable mechanical means actuated by the relay and a pair of normally open circuit closing contact points, said mechanical means and contact points being so constructed and arranged to momentarily close said contact points to actuate said timing mechanism as said mechanical means swings in one direction on electrical energization of said relay and to swing said mechanical means in an opposite direction upon deenergization of a relay preparatory to a succeeding cycle without effecting closure of said points.

References Cited in the file of this patent
UNITED STATES PATENTS

| Number | Name | Date |
|---|---|---|
| 1,714,085 | Getchell | May 21, 1929 |
| 1,813,191 | Mottau | July 7, 1931 |
| 1,986,392 | Denniston | Jan. 1, 1935 |
| 2,282,833 | Stimson | May 12, 1942 |
| 2,606,476 | Waller et al. | Aug. 12, 1952 |
| 2,663,477 | Bendz | Dec. 22, 1953 |